United States Patent [19]
Lau et al.

[11] Patent Number: 5,372,013
[45] Date of Patent: Dec. 13, 1994

[54] QUICK COOLING AIR CONDITIONING SYSTEM

[75] Inventors: Billy Y. B. Lau, 486 N. Vista Del Norte, Walnut, Calif. 91789; Shyn-Shyan Tung, La Verne, Calif.

[73] Assignee: Billy Y. B. Lau, Walnut, Calif.

[21] Appl. No.: 96,185

[22] Filed: Jul. 26, 1993

[51] Int. Cl.5 ............................................. F25B 41/00
[52] U.S. Cl. ...................................... 62/174; 62/509
[58] Field of Search .......................... 62/174, 509, 498

[56] References Cited
U.S. PATENT DOCUMENTS 3,736,763  6/1973  Garland ............................... 62/174
5,094,086  3/1992  Shyu ............................... 62/509 X Primary Examiner—William E. Wayner
Attorney, Agent, or Firm—Anthony J. Baca

[57] ABSTRACT

A quick cooling air conditioning system that uses a pressurized reservoir to preserve refrigerant in liquid form after the shutdown of air conditioning compressor. The quick air cooling is achieved by the vaporization of liquid refrigerant, supplied by refrigerant reservoir, at the startup of the conditioning system.

4 Claims, 1 Drawing Sheet

QUICK COOLING AIR CONDITIONING SYSTEM

FIELD OF THE INVENTION

The present invention relates to refrigeration systems. More particularly, the present invention describes a means to provide a quick cooling effect.

BACKGROUND OF THE INVENTION

An air conditioning system cannot pump heat when the refrigerant is in the non-operating equilibrium. Assuming that all other factors remain the same, the closer the refrigerant in the system is to the operating equilibrium, the more efficient the heat pumping action. When the refrigerant in the system is at a non-operating equilibrium, the efficiency is zero, even though the compressor may be running. Heat pumping efficiency of the air conditioning system increases from zero as the refrigerant in the system reaches the operating equilibrium.

Conventional systems allow the refrigerant to return to a non-operating equilibrium when the compressor is turned off. As a result, the air conditioning system has no heat pumping action the instant it is turned on. As stated above, once the compressor is turned on the efficiency of the air conditioning system starts to increase from zero as the refrigerant in the system reaches the operating equilibrium. This causes the delay from the time the system starts using energy to the time the system begins to cool.

Other attempts to provide quick cooling of an automobile's interior have been attempted. One such product that can quickly cool down the internal temperature of an automobile, is a pressurized spray can. Apparently the cooling effect is achieved by the depressurisation and evaporation of the chemical in the spray can. The major disadvantage of the product is that it is not reusable and has possible environmental impacts.

Therefore the primary purpose of the present invention is to provide cooling action and to increase the heat pumping efficiency to a positive number the instant when the compressor of an air conditioning system is turned on.

SUMMARY OF THE INVENTION

According to this invention, the time to cool the interior of an automobile during the startup can be shortened by the vaporization of liquid refrigerant. The liquid refrigerant is supplied by a refrigerant reservoir, where the reservoir is an addition to the conventional air conditioning system. A scheme has been proposed by this invention to integrate the refrigerant reservoir with the conventional air conditioning system to make this quick air cooling possible.

DETAILED DESCRIPTION OF THE INVENTION

Figure 1:
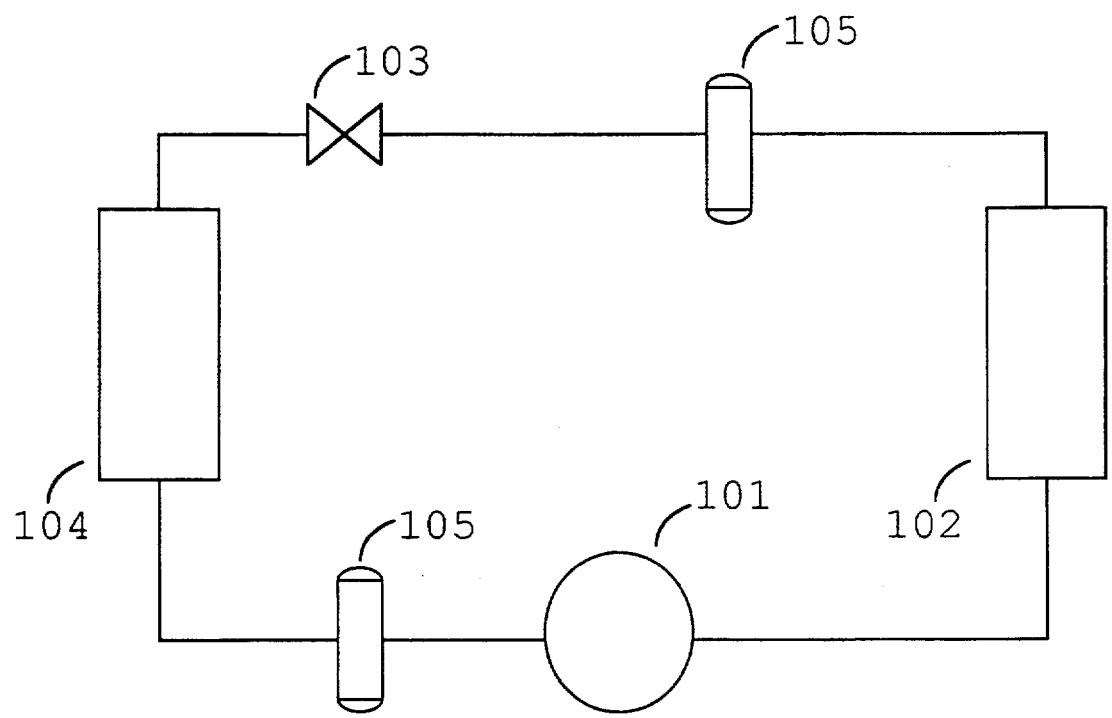
FIG. 1 is a schematic diagram showing a prior art air conditioning system.

A conventional air conditioning system is depicted in FIG. 1. The accumulator 105 is shown in two possible places; its placement is not important to the present invention. There are generally two equilibrium states that the system may be in. The first equilibrium state is referred as the non-operating equilibrium. After a system has not been in operation for while, the refrigerant will have the same pressure, phase, and temperature throughout the system. The second equilibrium state is referred to as the operating equilibrium. Referring to FIG. 1, when the system is operating in operation equilibrium the following is a list of phase and pressure of the refrigerant in the system:

A) Between compressor 101 and condenser 102: high pressure, has phase, high temperature.
B) Between condenser 102 and expansion valve 103: high pressure, liquid phase, a medium temperature
C) Between expansion valve 103 and evaporator 104: low pressure, gas phase, low temperature
D) Between evaporator 104 and compressor 101: low pressure, gas phase, medium temperature.

It would be apparent to one skilled in the art that for a non-operating equilibrium system, when the compressor is first energized, no heat pumping action is accomplished. Furthermore, maximum heat pumping action is not achieved until the system reaches the operating equilibrium.

To reduce this inefficiency, the air conditioning system may be used to give out cool air immediately if liquid refrigerant is available between the condenser 102 and the expansion 103 valve at the beginning of the operation of the air conditioning system.

The preferred embodiment is a modification of the conventional air conditioning system. The modification as conceptually shown on FIG. 2, consists of the addition of three valves (206–208) and a pressurized reservoir for liquid refrigerant 205. Refrigerant accumulator, which is normally in the air conditioning system, is not shown in FIG. 2 for clarification. However, it may be put in various locations as shown in FIG. 1 (105). Physically the accumulator and the reservoir may be combined into one unit depending on the actual design. Opening and closing of the valves shall be synchronized with the operation of the compressor as indicated by the lines.

Figure 2:
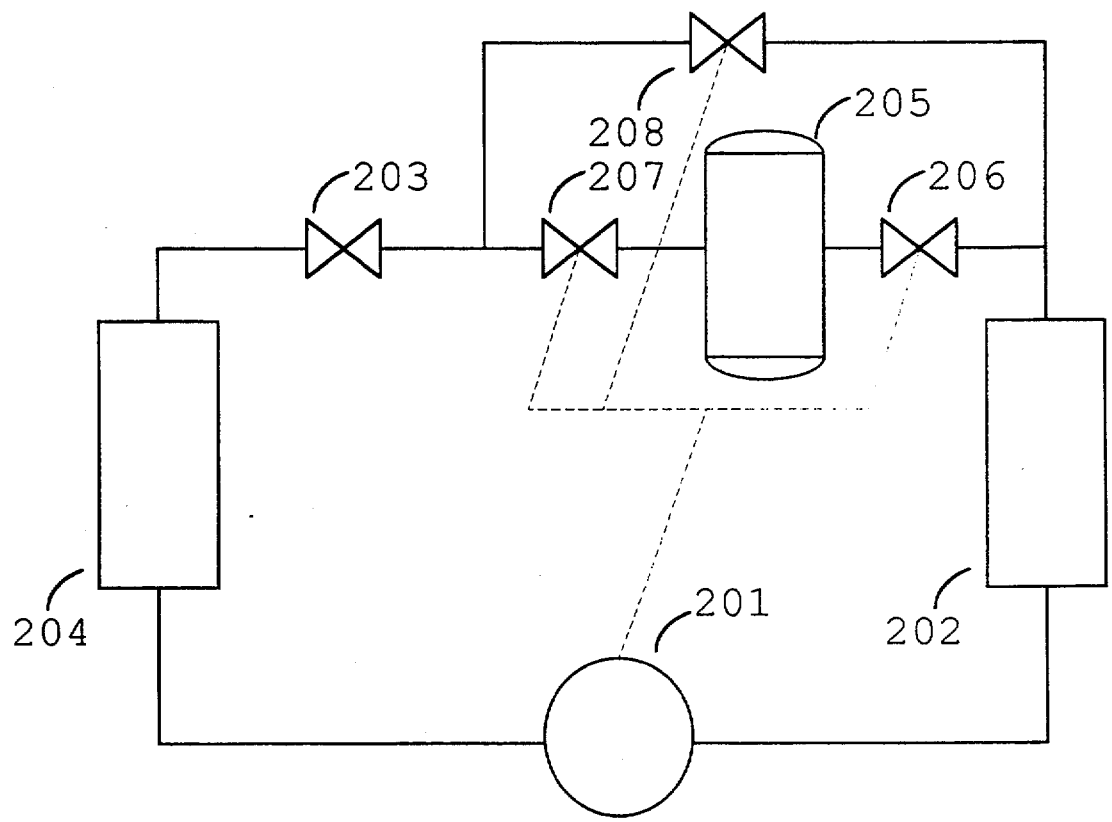
FIG. 2 is a schematic diagram showing an air conditioning system together with the modification proposed by this invention.

Referring to FIG. 2, the present invention consists of a compressor 201, condenser 202, expansion valve or similar devices 203, evaporator 204, refrigerant reservoir 205, upstream valve 206, downstream valve 207, and by-pass valve 208. Note that valve 208 allows the system to return to a non-operating equilibrium state when the system is shut off.

In operation, compressor 201 is running, valves 206 and 207 are open, valve 208 is closed, and the other parts of the system will operate as in the conventional system. As the refrigerant is compressed by the compressor 201, it changes into a liquid at the condenser 202. As with the conventional system, the liquid refrigerant vaporizes at the evaporator 204 through expansion 203 valve before returning to the compressor. The air cooling is achieved by the heat absorption due to the vaporization of liquid refrigerant at the evaporator.

When the compressor 201 is turned off, the valves 206 and 207 are closed, and valve 208 is opened. Thus, liquid refrigerant is trapped in the reservoir and stays in the liquid phase under ambient temperatures. Refrigerant in the rest of the system reaches the non-operating equilibrium state.

When the compressor 201 is turned on again, valves 206 and 207 are opened, and valve 208 is closed. Liquid refrigerant in the reservoir 205 will flow through expansion valve 203 (or similar devices) to evaporator 204 to provide quick cooling at the instant when the air conditioner is turned on. The time for the refrigerant in the preferred embodiment to achieve the operating equilibrium after turned on is greatly reduced compared to the time required for the conventional air conditioning system. Thus, the preferred embodiment has a positive heat pumping efficiency at start up while the conventional air conditioning system has zero efficiency at start up.

It may be necessary to delay the switching of valves 206-208 to allow the compressor to come up to speed first thereby reducing startup stress on compressor 201. Another possible solution, valve 206 could remain closed while valve 208 is closed and 207 is opened. This will keep the liquid refrigerant from back flowing into the compressor 201.

The preferred embodiment provides several advantages to other quick cooling solutions. The preferred embodiment can be added to existing air-conditioning systems with minimal modification to the original air conditioning system. Reservoir 205 and valves 206-208 could all be manufactured into a single component. Assuming that the accumulator (105 in FIG. 1) is between the condenser 102 and expansion valve 103, the single component can simply replace the accumulator.

This quick cooling system requires a relatively simple control system. Basically, the system must only open valves 206 and 207, close valve 208, when compressor 201 is turned on; close valves 206 and 207, open valve 208, when compressor 201 is turned off.

Another advantage of the preferred embodiment is the minimal use of mechanical moving parts, hence high reliability. The three additional valves (206-208) will not reduce the overall reliability of the system by a significant amount. Generally, leaks and faulty compressors are the primary source of system failures. An increased failure rate for the compressor could be caused by allowing the high pressure liquid in the reservoir to back flow into the compress during start-up of the compressor. This can be reduced by proper sequencing of the new valves as discussed above.

Several modifications are possible to the preferred embodiment. This includes:

1. Valve 208 could be a check valve or a small diameter tube like a capillary tube.
2. Valve 206 may be moved to a location between compressor 201 and condenser 202. Valve 208 has to be moved accordingly to provide the safety mechanism and allow the system to return to a non-operating equilibrium state during shutoff.
3. Other control mechanism for the valves is possible. For example, open valves 206 and 207, and closing valve 208, when the compressor 201 is turned on. Then, close valves 206 and 207, and open valve 208, when pressure at the reservoir reaches at certain pressure. To reduce start-up demand on the compressor, during the start-up period of the compressor, valve 206 could remain closed while valve 208 is closed and 207 is opened.

The same principle can also be used for other refrigeration system to reduce the time required to achieve refrigeration temperature. The principle can also be adapted to non-conventional air conditioning/refrigeration system so long as their cooling rate can be improved by the release of stored working medium during startup period.

In short, the present invention stores the liquid refrigerant produced by the system in operation in a reservoir. Thereby keeping the stored refrigerant under pressure and in a liquid phase when the compressor is turned off. To achieve quick cooling, the stored refrigerant is released to the evaporator through the expansion valve when the compressor is turned on (at startup).

Although the preferred embodiment of the invention has been illustrated, and that form described, it is readily apparent to those skilled in the art that various modifications may be made therein without departing from the spirit of the invention or from the scope of the appended claims.

What is claimed is:

1. A refrigeration system for providing a cooling effect upon startup, said refrigeration system comprising:

a compressor means for compressing a low pressure refrigerant into a compressed refrigerant;

a condenser means connected to said compressor means, said condenser means allows release of heat from said compressed refrigerant;

a first valve means connected to said condenser means, said first valve means being open when said compressor means is operating and in the alternative, said first valve being closed when said compressor means is turned-off;

a reservoir means connected to said first valve means, said reservoir means for storing said compressed refrigerant when said compressor means is turned-off;

a second valve means connected to said reservoir means, said second valve means being open when said compressor means is operating and in the alternative, said second valve being closed when said compressor means is turned-off;

an expansion valve means connected to said second valve, said expansion valve means for converting said compressed refrigerant to said low pressure refrigerant by allowing said refrigerant to expand in size, where said expanding in size of said refrigerant reduces said refrigerant's temperature;

a third valve means connected to said condenser means and said expansion valve means, said third valve means being closed when said compressor means is operating and in the alternative, said third valve being open when said compressor means is turned-off allowing said refrigeration system to reach a non-operating equilibrium state; and an evaporator means connected between said expansion valve means and said compressor means, said evaporator means provides said cooling effect by allowing external heat to be absorbed into said refrigerant.

2. A refrigeration system as claimed in claim 1 wherein:

said first valve means, when closed, prevents refrigerant from traveling between said condenser means and said reservoir means;

said second valve means, when closed, prevents refrigerant from traveling between said reservoir means and said expansion valve means; and said third valve means, when closed, prevents refrigerant from traveling between said condenser means and said expansion valve means.

3. A refrigeration system for providing a cooling effect upon startup, said refrigeration system comprising:

a compressor means for compressing a low pressure refrigerant into a compressed refrigerant;

a first valve means connected to said compressor means, said first valve means being open when said compressor means is operating and in the alternative, said first valve being closed when said compressor means is turned-off;

a condenser means connected to said compressor means, said condenser means allows release of heat from said compressed refrigerant;

a reservoir means connected to said first valve means, said reservoir means for storing said compressed refrigerant when said compressor means is turned-off;

a second valve means connected to said reservoir means, said second valve means being open when said compressor means is operating and in the alternative, said second valve being closed when said compressor means is turned-off;

an expansion valve means connected to said second valve, said expansion valve means for converting said compressed refrigerant to said low pressure refrigerant by allowing said refrigerant to expand in size, where said expanding in size of said refrigerant reduces said refrigerant's temperature;

a third valve means connected to said compressor means and said expansion valve means, said third valve means being closed when said compressor means is operating and in the alternative, said third valve being open when said compressor means is turned-off allowing said refrigeration system to reach a non-operating equilibrium state; and an evaporator means connected between said expansion valve means and said compressor means, said evaporator means provides said cooling effect by allowing external heat to be absorbed into said refrigerant.

4. A refrigeration system for providing a cooling effect upon startup, said refrigeration system comprising:

a compressor means for compressing a low pressure refrigerant into a compressed refrigerant, said compressor means having an inlet and an outlet;

a condenser means having an inlet and an outlet, said inlet of said condenser means connected to said outlet of said compressor means, said condenser means allows release of heat from said compressed refrigerant;

a first valve means having an inlet and an outlet, said inlet of said first valve means connected to said outlet of said condenser means, said first valve means being open when said compressor means is operating and in the alternative, said first valve being closed when said compressor means is turned-off;

a holding tank means having an inlet and an outlet, said inlet of said holding tank means connected to said outlet of said first valve means;

a second valve means having an inlet and an outlet, said inlet of said second valve means connected to said outlet of said holding tank means, said second valve means being open when said compressor means is operating and in the alternative, said second valve being closed when said compressor means is turned-off, whereby, said holding tank means holds said compressed refrigerant in a compressed stated when both said first valve means and said second valve means are closed;

an expansion valve means having an inlet and an outlet, said inlet of said expansion valve connected to said outlet of said second valve means, said expansion valve means for converting said compressed refrigerant to said low pressure refrigerant by allowing said refrigerant to expand in size, where said expanding in size of said refrigerant reduces said refrigerant's temperature;

a third valve means having an inlet and an outlet, said inlet of said third valve means connected to said outlet of said condenser means, said outlet of said third valve means connected to said inlet of said expansion valve means, said third valve means being closed when said compressor means is operating and in the alternative, said third valve being open when said compressor means is turned-off allowing said refrigeration system to reach a non-operating equilibrium state; and an evaporator means having an inlet and an outlet, said inlet of said evaporator means connected to said outlet of said expansion valve means and said outlet of said evaporator means said inlet of said compressor means, said evaporator means provides said cooling effect by allowing external heat to be absorbed into said refrigerant.

* * * * *

UNITED STATES PATENT AND TRADEMARK OFFICE
CERTIFICATE OF CORRECTION

PATENT NO. : 5,372,013
DATED : December 13, 1994
INVENTOR(S) : Billy Y. B. Lau and Shyn-Shyan Tung It is certified that error appears in the above-indentified patent and that said Letters Patent is hereby corrected as shown below:

In claim 3, at column 5 line 8, replace, "compressor" with --first valve--.
In claim 3, at column 5 line 12, replace, "first valve" with --condenser--.

Signed and Sealed this

Seventh Day of November, 1995

Attest:

BRUCE LEHMAN

Attesting Officer    Commissioner of Patents and Trademarks